(12) United States Patent
Prokscha et al.

(10) Patent No.: US 9,559,618 B2
(45) Date of Patent: Jan. 31, 2017

(54) CONTROLLER FOR A SEATBELT POSITIONING DEVICE AND SEATBELT POSITIONING DEVICE

(75) Inventors: Martin Prokscha, Schorndorf (DE); Wolfgang Holbein, Alfdorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 13/983,597

(22) PCT Filed: Feb. 14, 2012

(86) PCT No.: PCT/EP2012/000641
§ 371 (c)(1),
(2), (4) Date: Oct. 9, 2013

(87) PCT Pub. No.: WO2012/110229
PCT Pub. Date: Aug. 23, 2012

(65) Prior Publication Data
US 2014/0021900 A1    Jan. 23, 2014

(30) Foreign Application Priority Data
Feb. 18, 2011  (DE) ................ 10 2011 011 779

(51) Int. Cl.
*B60R 22/20*    (2006.01)
*B60R 22/34*    (2006.01)
(Continued)

(52) U.S. Cl.
CPC ............. *H02P 1/00* (2013.01); *B60R 22/03* (2013.01); *B60R 22/18* (2013.01); *B60R 2022/1806* (2013.01); *B60R 2022/4816* (2013.01)

(58) Field of Classification Search
CPC ........................................ B60R 22/48
(Continued)

(56) References Cited

U.S. PATENT DOCUMENTS 5,476,287 A * 12/1995 Lichtwardt ............. B60R 22/02
280/801.2
6,005,241 A * 12/1999 Doty ..................... B60R 22/343
250/222.1
(Continued)

FOREIGN PATENT DOCUMENTS

EP   1 357 002   10/2003
EP   1 655 186    5/2006
EP   1 783 014    5/2007

*Primary Examiner* — Eduardo Colon Santana
*Assistant Examiner* — Cortez Cook
(74) *Attorney, Agent, or Firm* — Tarolli, Sundheim, Covell & Tummino LLP

(57) ABSTRACT

A control (18) for a seat belt positioning device (10) includes a motor (12) for positioning a seat belt component (16). A locking tongue sensor (20) generates a locking tongue signal (S) depending on whether a locking tongue is inserted in a belt buckle (16). A trigger circuit (22) connected to the locking tongue sensor (20) generates a trigger signal (TR, TR1, TR2, VT, TM) in response to the locking tongue signal (S) A timer (32) or a motor load circuit (33) connected to the trigger circuit (22) generates a motor signal (M) having a predetermined period or depending on a motor load in response to the trigger signal (TR, TR1, TR2, VT, TM). A motor control circuit (34) connected to the timer (32) and the trigger circuit (22) turns the motor on and off in response to the motor signal (M). The direction of motion of the motor (12) is selected depending on the trigger signal (TR, TR1, TR2, VT, TM).

26 Claims, 4 Drawing Sheets

(51) Int. Cl.
 *H02P 1/00* (2006.01)
 *B60R 22/03* (2006.01)
 *B60R 22/18* (2006.01)
 *B60R 22/48* (2006.01)

(58) Field of Classification Search
 USPC .......................................... 297/475; 180/268
 See application file for complete search history.

(56) References Cited

U.S. PATENT DOCUMENTS

| | | |
|---|---|---|
| 2002/0167212 A1 | 11/2002 | Roger, Jr. et al. |
| 2003/0075914 A1* | 4/2003 | Kohlndorfer et al. .. B60R 22/03 280/808 |
| 2004/0217583 A1 | 11/2004 | Wang |
| 2005/0205330 A1* | 9/2005 | Higashiyama ...... B60R 21/0134 180/268 |
| 2005/0206150 A1 | 9/2005 | Yamaguchi et al. |
| 2008/0238076 A1* | 10/2008 | Takao ..................... B60R 22/02 280/807 |
| 2010/0007191 A1* | 1/2010 | Takao ..................... B60R 22/02 297/475 |

* cited by examiner

CONTROLLER FOR A SEATBELT POSITIONING DEVICE AND SEATBELT POSITIONING DEVICE

RELATED APPLICATIONS

This application corresponds to PCT/EP2012/000641, filed Feb. 14, 2012, which claims the benefit of German Application No. 10 2011 011 779.2, filed Feb. 18, 2011, the subject matter, of which are incorporated herein by reference in their entirety.

BACKGROUND OF THE INVENTION

The invention relates to a control for a seat belt positioning device comprising a motor for positioning a seat belt component as well as a seat belt positioning device comprising a motor for positioning a seat belt component.

From the state of the art seat belt positioning devices, for example belt buckle feeders or belt feeders, are known which move a component of the seat belt system, for example the belt buckle or the belt, to a fastening position in which fastening of the seat belt is easy and convenient for the vehicle occupant. After fastening the seat belt the component is moved to a retaining position in which a good protective function of the seat belt system is ensured and/or the component does not hinder the vehicle occupant.

For controlling such seat belt positioning device frequently complicated controls are provided to detect and process a plurality of sensor data, for instance the position of a drive of the positioning device or a vehicle occupant detection, in particular via a connection of the seat belt positioning device to the vehicle electronics.

A control of this type is known e.g. from U.S. Pat. No. 6,883,834 B2, wherein the control detects opening and closing of the vehicle door and depending thereon moves the belt buckle from a retaining position to an offering position. After reaching the offering position, the belt buckle remains in the offering position for a predetermined period of time in order to be moved to the retaining position after expiry of said period of time. The end positions are detected by two position sensors. This requires an expensive design and sensor system.

SUMMARY OF THE INVENTION

It is the object of the invention to provide a simple control for a seat belt positioning device as well as an inexpensive seat belt positioning device.

In accordance with the invention, the object is achieved by a control for a seat belt positioning device comprising a motor for positioning a seat belt component. The control comprises a locking tongue sensor generating a locking tongue signal depending on whether a locking tongue is inserted in a belt buckle, a trigger circuit connected to the locking tongue sensor and generating a trigger signal in response to the locking tongue signal; a timer connected to the trigger circuit and generating a motor signal having a predetermined duration in response to the trigger signal, and a motor control circuit connected to the timer and the trigger circuit and turning the motor on and off in response to the motor signal, wherein the direction of motion of the motor is selected depending on the trigger signal. Such control includes merely one sensor, i.e. the locking tongue sensor, which permits a simple control of the seat belt positioning device. No external data of the vehicle have to be detected for the control, thereby no connection of the seat belt positioning device to the vehicle electronics being required. In the control according to the invention no bus drive is provided which renders the control inexpensive.

As an alternative, instead of the timer a motor load circuit can be provided which is connected to the trigger circuit and a motor load sensor, the motor load sensor detecting a motor current flowing through the motor and generating a motor signal in response to the trigger signal as long as the motor current is below a blockade current level. In this way the respective end positions of the seat belt component can be detected by an increase in the motor current above the blockade current level.

Preferably the trigger circuit includes a first trigger stage generating a basic trigger signal which is correlated in time to the locking tongue signal. In this way the signal of the locking tongue sensor can be processed, for instance digitalized, for further processing.

The trigger circuit may include a second trigger stage connected to the first trigger stage and generating a first auxiliary trigger signal in response to a positive edge in the basic trigger signal and a second auxiliary trigger signal in response to a negative edge in the basic trigger signal. In this way, the trigger signal can be split up, the two auxiliary trigger signals permitting separate processing of fastening and unfastening operations of the seat belt system.

In order to allow for activating the motor of the seat belt positioning device in a way delayed vis-à-vis the locking tongue signal, a delay circuit connected to the second trigger stage and generating a first and/or second delayed auxiliary trigger signal can be provided which is delayed in time by at least a predetermined delay period vis-à-vis the first and/or second auxiliary trigger signal.

In order to obtain a common control signal for the motor for fastening and unfastening operations, preferably an OR gate is provided that is connected to the second trigger stage and the delay circuit, resp., and provides a motor trigger signal to the timer and the motor load circuit, resp., in response to the first or second auxiliary trigger signal or the delayed auxiliary trigger signal, respectively.

By selecting the direction of motion of the motor depending on the basic trigger signal a simple control of the direction of motion of the motor is enabled.

For controlling the motor the motor control circuit may have a field effect transistor, the gate of the field effect transistor being connected to the timer and the motor load circuit, resp., and a motor current being provided in response to the motor signal.

Preferably the motor control circuit includes a relay connected to the trigger circuit and determining the direction of motion of the motor in response to a trigger signal.

In order to permit manual control of the seat belt positioning device, for example when loading the vehicle, a manually operable switch connected to the trigger circuit may be provided, the trigger signal being generated depending on the position of the switch.

Preferably the switch and the locking tongue sensor are connected to the trigger circuit via a logic control element, the logic control element being designed so that in a switch position the trigger circuit generates the trigger signal independently of the locking tongue signal.

An ignition key sensor may be provided which generates an ignition key signal and is connected to the trigger circuit, the trigger signal being generated depending on the ignition key signal. In this way, for unfastening the belt buckle can be moved into a comfort position for unfastening after withdrawing the ignition key.

The ignition key sensor and the locking tongue sensor are preferably connected to the trigger circuit via a logic control element, the logic control element being designed so that the trigger circuit generates the trigger signal independently of the locking tongue signal in a condition of the ignition key signal.

There can be provided sensors for detecting the position of the back seat or the folding position of the passenger front seat so as to move the motor to the engaged position.

Furthermore, the object of the invention is achieved by a seat belt positioning device comprising a motor for positioning a seat belt component including a control as described in the foregoing.

The simple control permits a seat belt positioning device of simple design which can be manufactured especially inexpensively.

For example, the seat belt positioning device is a belt buckle feeder which enables a belt buckle to be positioned at a fastening position and a retaining position or only at a fastening position.

BRIEF DESCRIPTION OF THE DRAWINGS

Further advantages and features of the invention are resulting from the following description and from the drawings which are referred to. The drawings show in.

DESCRIPTION OF EXEMPLARY EMBODIMENTS

Figure 1:
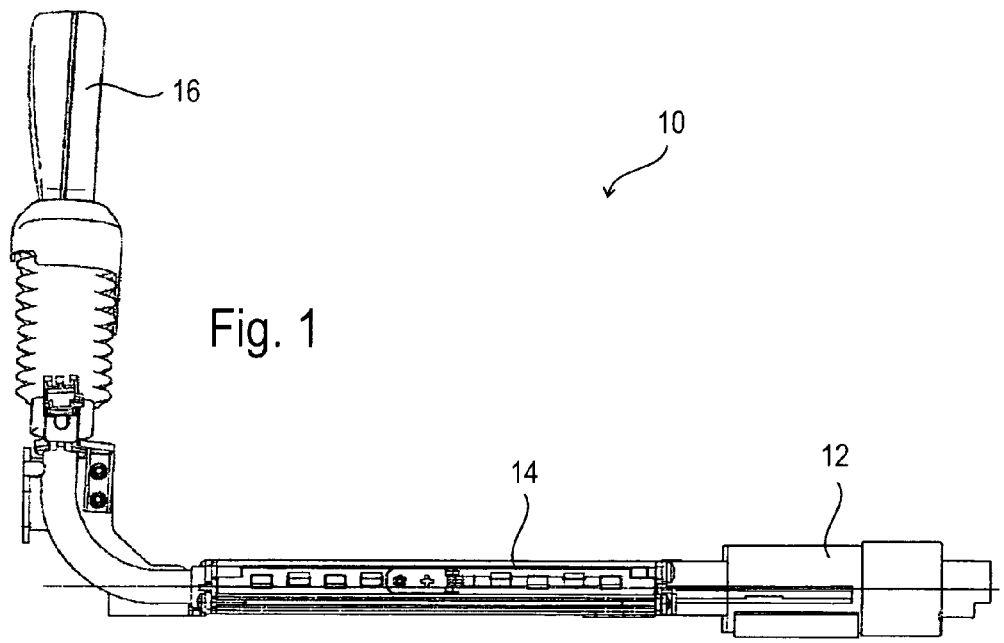
FIG. 1 a seat belt positioning device according to the invention.

FIG. 1 illustrates a seat belt positioning device 10 in the form of a belt buckle feeder for a seat belt system of a vehicle. The belt buckle feeder comprises a motor 12 adapted to vary the position of a belt buckle 16 via a gear drive 14, for example a spindle drive. The belt buckle 16 can be moved upwards to a fastening position at which a locking tongue of the seat belt system can be inserted in a simple manner for the vehicle occupant. After inserting the locking tongue the belt buckle 16 can be moved downwards by the seat belt positioning device 10 to a retaining position at which a perfect functioning of the vehicle safety system is ensured. Depending on the direction of motion of the motor 12, the belt buckle 16 is moved in the direction of the fastening position or in the direction of the retaining position. The belt buckle feeder can also have a different design.

The belt buckle feeder has to be considered to be merely one embodiment. Also other embodiments of the seat belt positioning device 10 are provided, especially belt feeders moving a seat belt to a position which can be seized more easily via sort of a fork.

Figure 2:
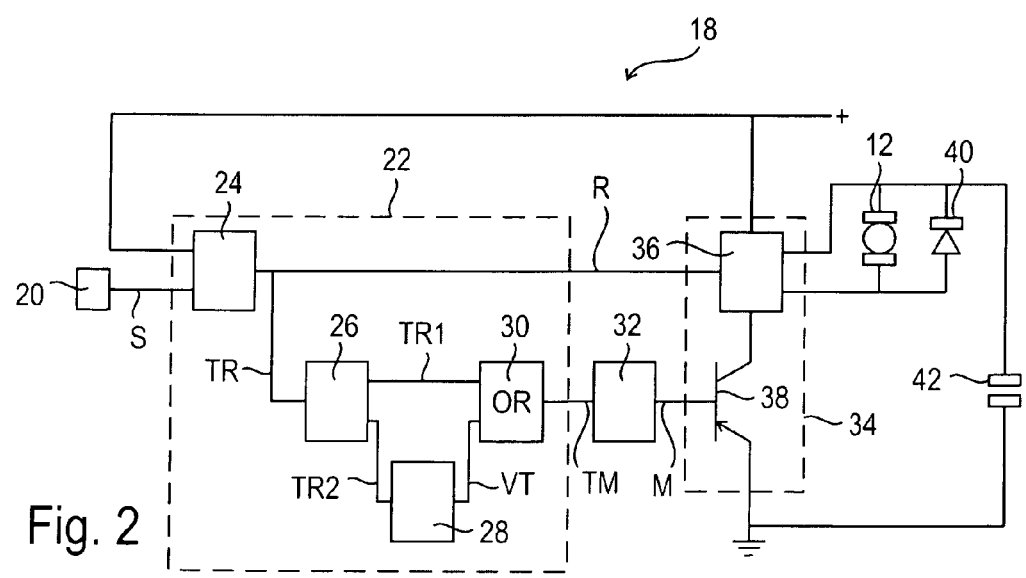
FIG. 2 a block diagram of a control according to a first embodiment of the invention.

The seat belt positioning device 10 is controlled by means of the control 18 illustrated in FIG. 2. The time course of the different control signals is shown in an example of application in FIG. 5. The control 18 comprises a locking tongue sensor 20 generating a locking tongue signal S depending on whether a locking tongue is inserted in the belt buckle 16. In the shown embodiment the locking tongue sensor 20 provides a digital signal S which adopts the value 0 when the locking tongue is not inserted in the belt buckle 16 and adopts the value 1 when the locking tongue is inserted in the belt buckle 16. The locking tongue sensor 20 could also produce a different signal, however, for example an analog signal.

Figure 5:
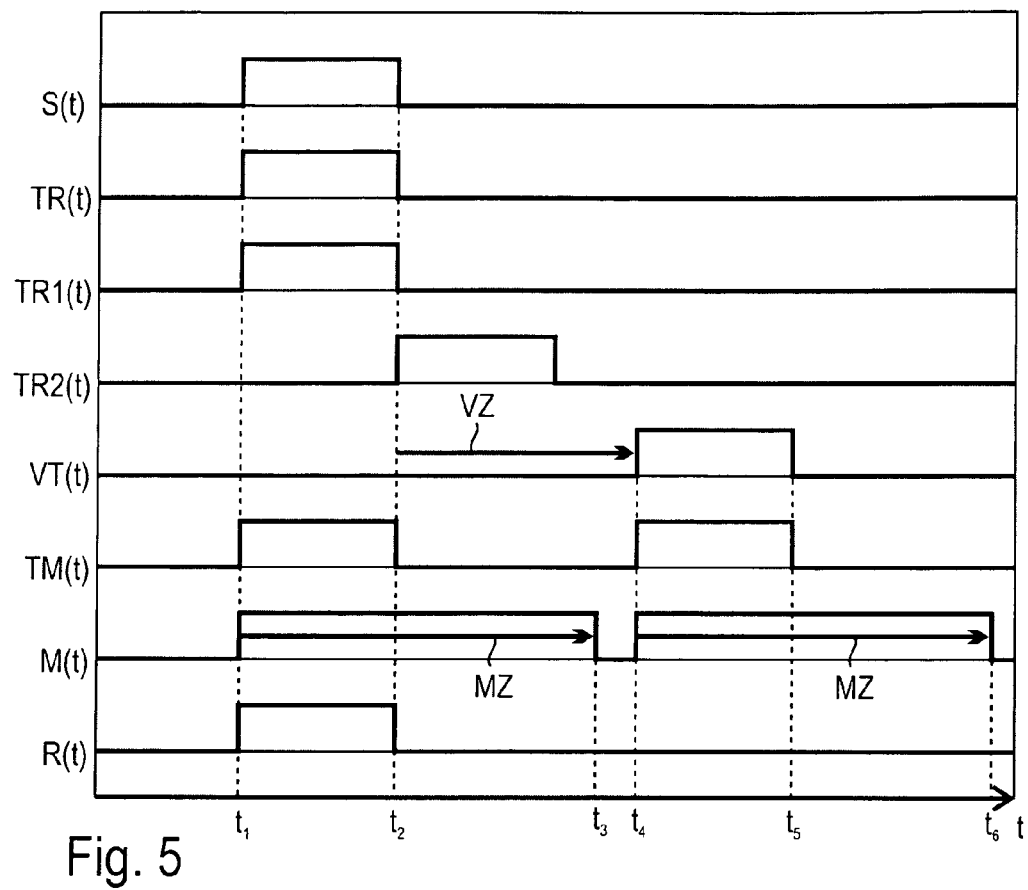
FIG. 5 a representation of the time course of the control signals of the control according to FIG. 2.

The time course S(t) of the locking tongue signal S is shown in the first line of FIG. 5. The locking tongue is inserted in the belt buckle between the point in time $t_1$ and the point in time $t_2$ and during the residual time it is outside the belt buckle.

A trigger circuit 22 is provided which is connected to the locking tongue sensor 20 and generates a trigger signal in response to the locking tongue signal S. The trigger circuit 22 comprises a first trigger stage 24 generating a basic trigger signal TR which is correlated in time with the locking tongue signal S. In the shown embodiment the basic trigger signal TR corresponds to the digital locking tongue signal S. There can also be provided an adaptation of the voltage level between the locking tongue signal S and the basic trigger signal TR, the voltage level of the basic trigger signal TR being suited for the subsequent processing in the control 18. As an alternative, for example in the case of an analog locking tongue signal the plug-in signal could be digitalized.

Upon the inserting operation at the point in time $t_1$ the basic trigger signal has a positive leading edge and upon the unfastening operation at the point in time $t_2$ it has a negative trailing edge.

A second trigger stage 26 receives the basic trigger signal TR and generates a first auxiliary trigger signal TR1 in response to a positive edge in the basic trigger signal TR and a second auxiliary trigger signal TR2 in response to a negative edge in the basic trigger signal TR. In this way, fastening operations (inserting the locking tongue) are associated with the first auxiliary trigger signal TR1 and unfastening operations (removing the locking tongue) are associated with the second auxiliary trigger signal TR2 and can be processed separately from each other.

In the shown embodiment in FIG. 5, at the time $t_1$ (of the positive edge of the basic trigger signal TR) the first auxiliary trigger signal TR1 is set from 0 to 1. In the embodiment the first auxiliary signal TR1 is reset to 0 at the time $t_2$. However, also substantially any other point in time could be chosen to reset the auxiliary trigger signal TR1 to 0, especially only a short trigger pulse can be provided in the auxiliary trigger signal TR1.

The second auxiliary trigger signal TR2 is set from 0 to 1 at the time $t_2$ (negative edge of the basic trigger signal TR) and is reset to 0 corresponding to the first auxiliary trigger signal TR1 after substantially any time.

A delay circuit 28 is connected to the second trigger stage 26 and receives the second auxiliary trigger signal TR2 and generates a second delayed auxiliary trigger signal VT which is delayed in time by a predetermined delay period VZ vis-à-vis the second auxiliary trigger signal TR2. In the embodiment the delay period VZ is predetermined by the time difference $t_4 - t_2$.

In the control according to FIG. 2 no delay circuit is provided for the first auxiliary trigger signal TR1. It is also possible, however, that alternatively or additionally another delay circuit is provided for receiving the first auxiliary trigger signal TR1 and generating a first delayed auxiliary trigger signal which is delayed in time by a predetermined delay period. The delay periods of the first and second delayed auxiliary trigger signals can have equal or different durations.

An OR gate 30 is provided which is connected to the second trigger stage 26 and the delay circuit 28 and receives the first auxiliary trigger signal TR1 and the second delayed auxiliary trigger signal VT and in response thereto supplies a motor trigger signal TM(t). The OR gate 30 combines the two partial signals associated with inserting and removing operations into a common signal again.

If no delay of the trigger signals is desired, the splitting of the basic trigger signal TR into two auxiliary trigger signals TR1, TR2 by the second trigger stage 26 and the subsequent combination thereof by the OR gate 30 can be dispensed with.

The motor trigger signal TM is provided to a timer 32. In response to the motor trigger signal TM, the timer 32 generates a motor signal M having a predetermined period MZ. After each pulse in the motor trigger signal TM the motor signal is set from 0 to 1 for the predetermined period MZ.

A motor control circuit 34 is connected to the timer 32 and receives the motor signal M so as to turn the motor 12 on and off in response to the motor signal M. The motor control circuit 34 furthermore is connected to the trigger circuit 22 and the direction of motion of the motor 12 is selected depending on the basic trigger signal TR. The basic trigger signal TR which is guided to the motor control 34 is marked as directional signal R in FIG. 2 and FIG. 5. As an alternative, the direction of motion of the motor 12 could also be selected depending on other trigger signals, for instance the first and second auxiliary trigger signals TR1, TR21 (or the delayed auxiliary trigger signals thereof).

In the shown embodiment the motor control circuit 34 includes a relay 36 which is connected to the trigger circuit 22 and determines the direction of motion of the motor in response to the basic trigger signal.

The motor control circuit 34 further comprises a field effect transistor 38, the gate of the field effect transistor being connected to the timer 32 and a motor current being provided in response to the motor signal M(t).

A Schottky diode element 40 is connected in parallel to the motor 12.

A capacitive element 42 is connected between the motor 12 and the zero potential.

The control method shall be described hereinafter by way of an example of use in FIG. 5. The locking tongue is inserted in the belt buckle 16 at the point in time $t_1$ and is removed from the belt buckle again at the point in time $t_2$, accordingly between these times the locking tongue signal S is in the condition 1 and for the residual time in the condition 0.

The basic trigger signal TR corresponds to the time course of the locking tongue signal S. At the leading edge of the basic trigger signal TR the first auxiliary trigger signal TR1 is set to the condition 1 for a pulse duration. In the embodiment the pulse duration corresponds to the difference in time between $t_1$ and $t_2$. At the trailing edge of the basic trigger signal TR the second auxiliary trigger signal is correspondingly set to the condition 1 for a pulse duration.

The second delayed auxiliary trigger signal VT generated by the delay circuit 28 is delayed by the period VZ vis-à-vis the auxiliary trigger signal. In this way during an unfastening operation the motor 12 is started as late as after the delay period VZ.

The OR gate 30 combines the first auxiliary trigger signal TR1 and the second delayed auxiliary trigger signal VT. The motor trigger signal MT formed in this way shows both the trigger pulse of the first auxiliary trigger signal and the trigger pulse of the second delayed auxiliary trigger signal VT.

Both trigger pulses (at the points in time $t_1$ and $t_4$) of the motor trigger signal MT cause the timer 32 to set the motor signal to the condition 1 for a respective predetermined period MZ.

The motor control circuit 34 thus turns on the motor 12 for the predetermined period MZ at each of the points in time $t_1$ and $t_4$. The direction of motion of the motor 12 is predetermined via the relay 36 in response to the directional signal R corresponding to the basic trigger signal TR.

If the directional signal R corresponding to the basic trigger signal is in the condition 1, the belt buckle is moved by the seat belt positioning device 10 in the direction of its retaining position (cf. point in time $t_1$). If instead the directional signal R is in the condition 0, the belt buckle is moved in the direction of the fastening position.

In the illustrated embodiment thus the belt buckle is thus moved, triggered by inserting the locking the tongue in the belt buckle at the point in time $t_1$, in the direction of its retaining position until the point in time $t_3$. The removal of the locking tongue from the belt buckle at the point in time $t_2$ triggers, with a delay by the delay period VZ, movement of the belt buckle from the point in time $t_4$ to $t_6$ in the direction of its fastening position.

In each case the belt buckle is moved in one direction over a fixed period MZ. Since no position detection of the drive is provided, the gear drive 14 may happen to abut against an end stop. The gear drive is designed so that no jamming or damage of the gear drive will occurs.

Figure 3:
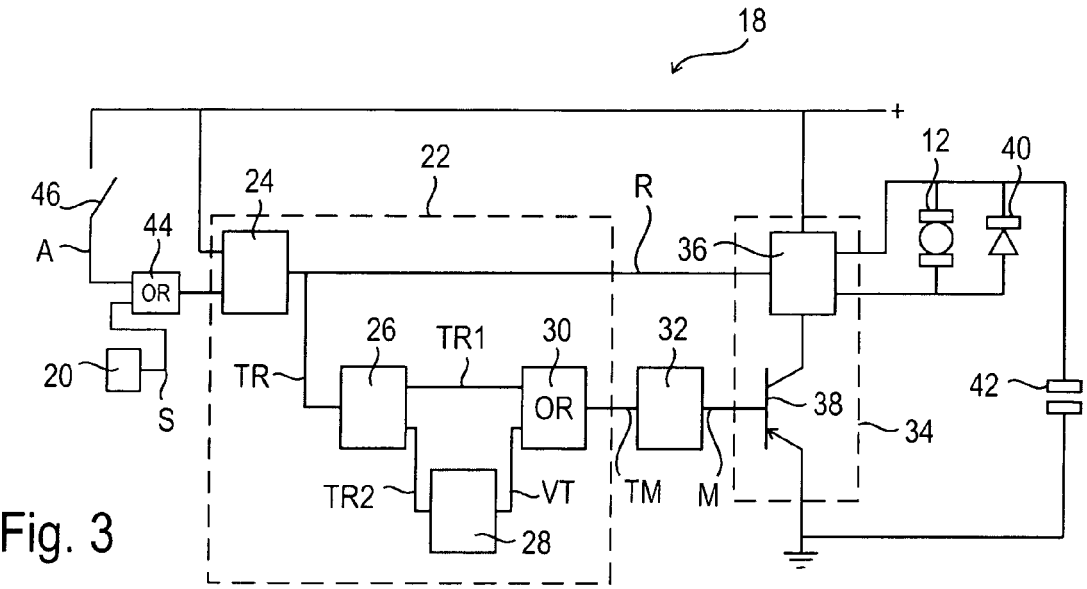
FIG. 3 a block diagram of a control according to a second embodiment of the invention.

The embodiment of the control 18 shown in FIG. 3 differs from the first embodiment by a logic control element 44 connected ahead of the trigger circuit 22 and a manually operable switch 46. The logic control element 44 is configured so that the trigger circuit 22 generates the basic trigger signal independently of the locking tongue signal S when the switch is closed. In the shown embodiment a switching signal A, which is 0 when the switch position is open and is 1 when the switch position is closed, is generated via the switch 46.

The locking tongue sensor 20 and the switch 46 are connected to the first trigger stage 24 via the logic control element 44 designed as OR element. If the manually operable switch 46 is closed, independently of the locking tongue signal S the control 18 behaves as if the locking tongue were inserted in the belt buckle 16. Thus the belt buckle 16 is moved in the direction of its retaining position. In this way, for instance when loading the vehicle on the back seat, the belt buckles can be engaged in their retaining positions, whereby they do not hinder the loading operation.

The manually operable switch 46 can be controlled additionally or alternatively via sensors that are capable of detecting folding of the back seat or a front seat, especially the front passenger seat.

When the switch 46 is opened again, the control 18 again behaves in response to the locking tongue signal S.

Figure 4:
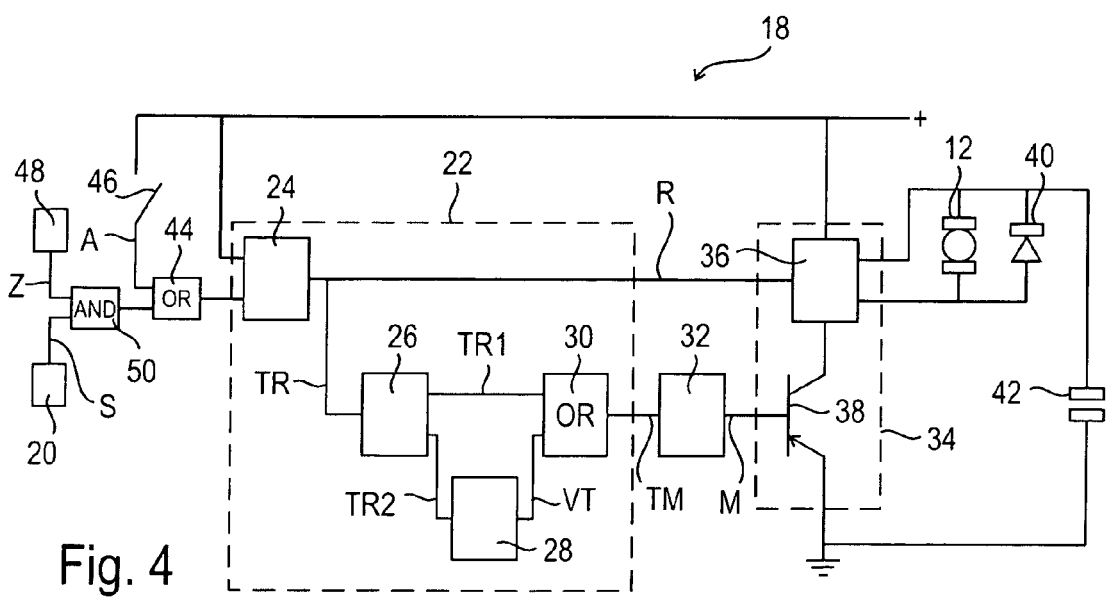
FIG. 4 a block diagram of a control according to a third embodiment of the invention.

FIG. 4 illustrates a third embodiment of the control 18, wherein, compared to the second embodiment, an ignition key sensor 48 generating an ignition key signal Z is additionally provided. The ignition key sensor 48 and the locking tongue sensor 20 are connected to the trigger circuit 20 via a logic control element 50, the logic control element 50 being configured so that in a condition of the ignition key signal Z the trigger circuit 22 generates the basic trigger signal independently of the locking tongue signal.

In the shown embodiment the logic control element is an AND element. The ignition key sensor 48 generates the ignition key signal Z in the condition 1 when the ignition key is inserted, whereas the ignition key signal Z is generated in the condition 0 when the ignition key is withdrawn. The locking tongue signal S is thus transmitted to the trigger circuit 22 only when the ignition key is inserted (ignition key signal Z=1) via the logic control element 50.

The function of the second and third embodiments of the control 18 will be described hereinafter by way of FIG. 6. At the point in time $t_1$ the manually operable switch 46 is closed, thereby the switch signal A being set from 0 to 1. The switch 46 remains closed until the time $t_2$ and then is opened again. The locking tongue of the seat belt system is not engaged in the belt buckle at any of said times so that the locking tongue signal S is in the condition 0. Via the logic control element 44 (OR) the switch signal A is transmitted to the first trigger stage 24 of the trigger circuit 22. The basic trigger signal TR is thus set to 1 corresponding to the switch signal A at the time $t_1$ and to 0 at the time $t_2$. The further processing of the basic trigger signal TR is performed analogously to the first embodiment of the control 18.

At the point in time $t_3$ the locking tongue is inserted in the belt buckle, whereby the locking tongue signal S is set to 1. At the point in time $t_4$ the locking tongue is removed from the belt buckle 16 again and the locking tongue signal S is reset to 0. During this time the ignition key is not inserted so that the ignition key signal Z is in the condition 0. Thus the locking tongue signal S is not transmitted via the logic control element 50 (AND) to the trigger circuit 22 so that the basic trigger signal TR remains in the condition 0 between the points in time $t_3$ and $t_4$.

At the point in time $t_5$ the ignition key is inserted and the ignition key signal Z is set to the condition 1.

Between the points in time $t_6$ and $t_7$ the locking tongue is inserted in the belt buckle 16 again, thereby the locking tongue signal S being provided in the condition 1 between the points in time $t_6$ and $t_7$. Since both the locking tongue signal S and the ignition key signal Z are provided in the condition 1 between the times $t_6$ and $t_7$, the condition 1 is transmitted to the trigger circuit 22 and the basic trigger signal TR is set to the condition 1 from the time $t_6$ to the time $t_7$.

Figure 6:
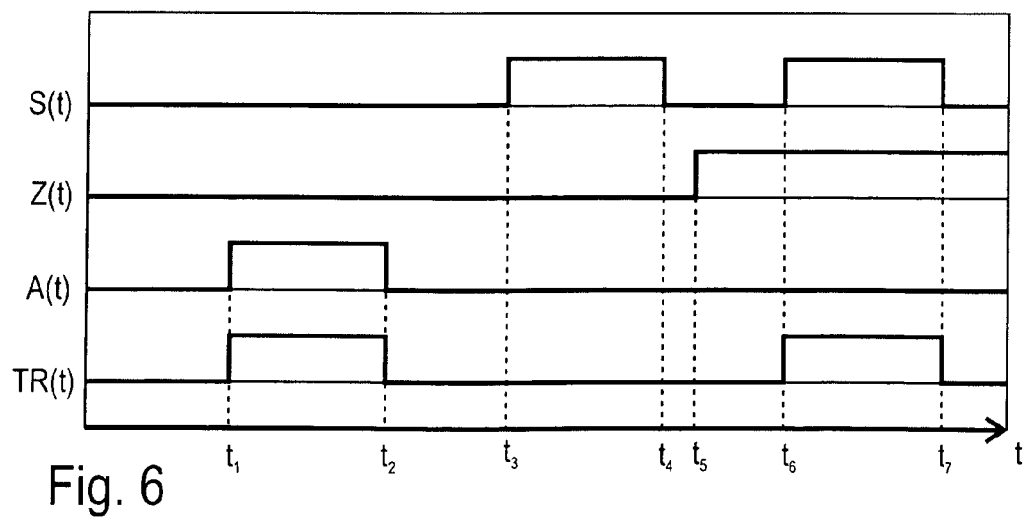
FIG. 6 a time course of the control signals of the control according to FIG. 4.
Figure 7:
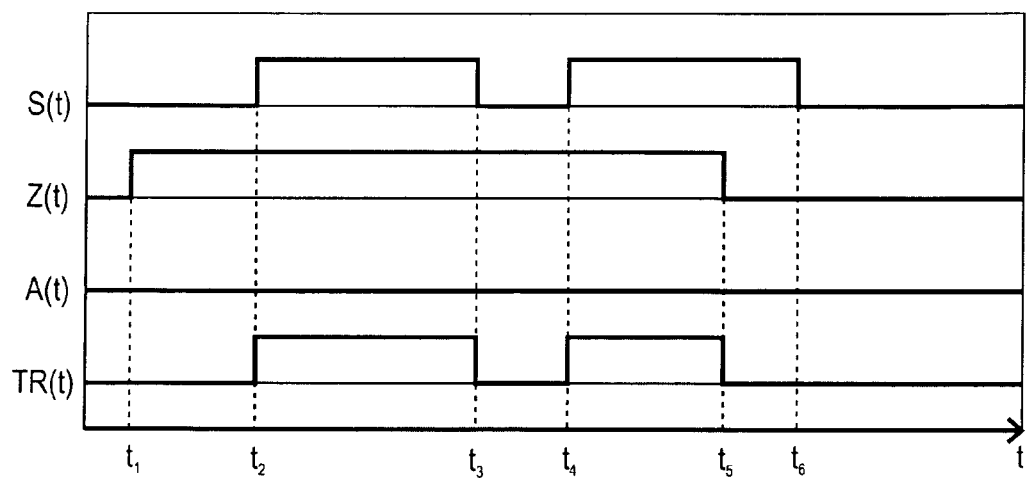
FIG. 7 a further time course of the control signals of the control according to FIG. 4.

FIG. 7 illustrates a further course of the control signals analogously to FIG. 6. The times $t_1$ to $t_3$ correspond to the times $t_5$ to $t_7$ in FIG. 6. At the point in time $t_4$ the locking tongue is inserted in the belt buckle and locking tongue signal S is set to the condition 1. Since at the point in time $t_4$ the ignition key is inserted and the ignition key signal Z is provided in the condition 1, the basic trigger signal TR is set to the condition 1 at the time $t_4$.

At the time $t_5$ the ignition key is removed, thereby the ignition key signal Z being set to the condition 0. Accordingly, the basic trigger signal TR is set to 0 while the locking tongue continues being inserted. In this way, when the ignition key is withdrawn, in the design of the seat belt positioning device as belt buckle feeder the belt buckle is moved to the fastening position, thereby releasing the locking tongue is facilitated for the vehicle occupant.

Figure 8:
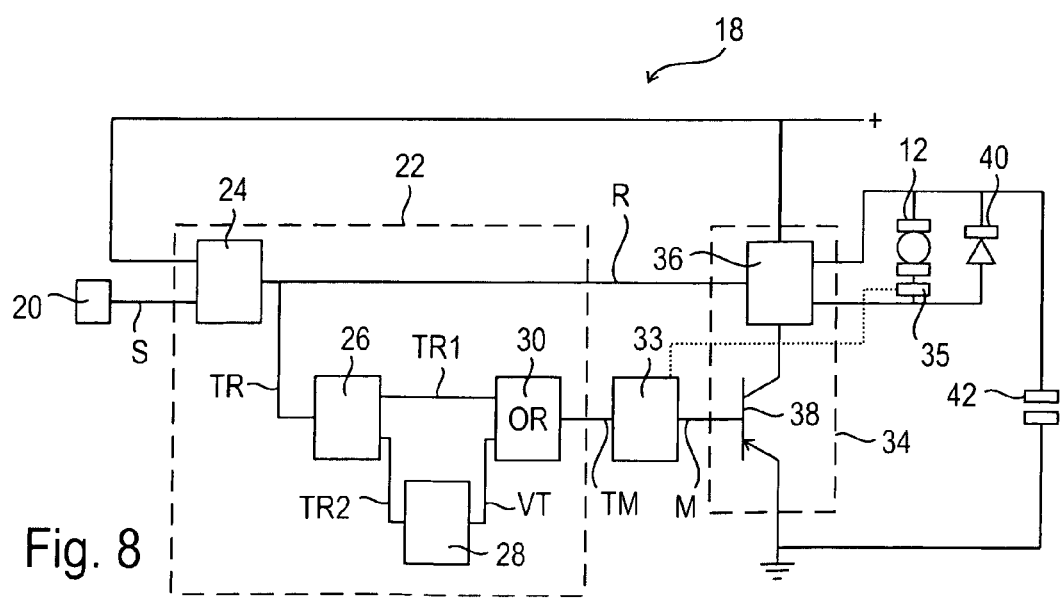
FIG. 8 a block diagram of a control according to a fourth embodiment of the invention.

FIG. 8 shows an alternative embodiment of the control 18. Instead of the timer 32 of the preceding embodiments, a motor load circuit 33 is provided. Furthermore a motor load sensor 35 is provided for detecting a motor current flowing through the motor 12.

The motor load circuit 33 is connected to the motor load sensor 35 and the trigger circuit 22 and, in response to the motor trigger signal TM, generates a motor signal M as long as the motor current is below a blockade current level. During operation of the motor 12 the motor current is below the blockade current level at positions between the two end positions. When the end position of the seat belt component 16 is reached, the motor current increases and lies above the blockade current level, whereby the motor signal M is interrupted and is set to 0, respectively. The further components are substantially identical to the embodiment shown in FIG. 2. Thus the control 18 supplies current to the motor 12 after inserting or removing the locking tongue in the respective appropriate direction of rotation until the blockade current level is exceeded upon reaching the corresponding end position.

The motor load circuit 33 and the motor load sensor 35 can also be used analogously in the controls 18 according to FIG. 3 or 4.

The invention claimed is:

1. A control (18) for a seat belt positioning device (10) comprising a motor (12) for positioning a seat belt component (16) comprising:
    a locking tongue sensor (20) generating a locking tongue signal (S) depending on whether a locking tongue is inserted in a belt buckle (16);
    a trigger circuit (22) which is connected to the locking tongue sensor (20) and generates a trigger signal (TR, TR1, TR2, VT, TM) in response to the locking tongue signal;
    a timer (32) which is connected to the trigger circuit (22) and generates a motor signal (M) for a predetermined period of time (MZ) in response to the trigger signal (TR, TR1, TR2, VT, TM);
    a motor control circuit (34) connected to the timer (32) and the trigger circuit (22) and turning the motor (12) on in response to the motor signal (M) and off at the end of the predetermined period of time (MZ) wherein the direction of motion of the motor (12) is selected from a first direction to position the seat belt component in a fastening position and a second direction to position the seat belt component in a retaining position depending on the trigger signal (TR, TR1, TR2, VT, TM); and
    wherein the trigger circuit (22) has a first trigger stage (24) generating a basic trigger signal (TR) which is correlated in time with the locking tongue signal (S), the trigger circuit (22) having a second trigger stage (26) connected to the first trigger stage (24) and generating a first auxiliary trigger signal (TR1) in response to a positive edge in the basic trigger signal (TR) and a second auxiliary trigger signal (TR2) in response to a negative edge in the basic trigger signal (TR).

2. The control according to claim 1, wherein at least one delay circuit (28) is provided which is connected to the second trigger stage (26) and which generates a first and/or second delayed auxiliary trigger signal (VT) delayed in time by at least a predetermined delay period (VZ) vis-à-vis the first and/or second auxiliary trigger signal (TR1, TR2).

3. The control according to claim 2, wherein an OR gate (30) is provided which is connected to the second trigger stage (26) and the delay circuit (28), respectively, and provides a motor trigger signal (TM) to the timer (32) in response to the first or second auxiliary trigger signal (TR1, TR2) and the delayed auxiliary trigger signal (VT), respectively.

4. The control according to claim 1, wherein the direction of motion of the motor (12) is selected in response to the basic trigger signal (TR).

5. The control according to claim 1, wherein the motor control circuit (34) includes a field effect transistor (38), the gate of the field effect transistor (38) being connected to the timer (32) and a motor current being provided in response to the motor signal (M).

6. The control according to claim 1, wherein the motor control circuit (34) has a relay (36) connected to the trigger circuit (22) and determining the direction of motion of the motor (12) in response to a trigger signal (TR, TR1, TR2, VT, TM).

7. The control according to claim 1, wherein a manually operable switch (46) is provided which is connected to the trigger circuit (22), the trigger signal (TR, TR1, TR2, VT, TM) being generated depending on the switch position (A).

8. The control according to claim 7, wherein the switch (46) and the locking tongue sensor (20) are connected to the trigger circuit (22) via a logic control element (44), the logic control element (44) being configured so that at a switch position (A) the trigger circuit (22) generates the trigger signal (TR, TR1, TR2, VT, TM) independently of the locking tongue signal (S).

9. The control according to claim 1, wherein an ignition key sensor (48) is provided which generates an ignition key signal (Z) and is connected to the trigger circuit (22), the trigger signal (TR, TR1, TR2, VT, TM) being generated depending on the ignition key signal (Z).

10. The control according to claim 9, wherein the ignition key sensor (48) and the locking tongue sensor (20) are connected to the trigger circuit (22) via a logic control element (50), the logic control element (50) being configured so that in a condition of the ignition key signal (Z) the trigger circuit (22) generates the trigger signal (TR, TR1, TR2, VT, TM) independently of the locking tongue signal (S).

11. The control according to claim 1, wherein sensors are provided for detecting the position of a back seat or the folding position of a front seat, especially the front passenger seat, so as to move the seat belt positioning device (10) into the engaged position.

12. A control (18) for a seat belt positioning device (10) comprising a motor (12) for positioning a seat belt component (16) comprising:
a locking tongue sensor (20) generating a locking tongue signal (S) depending on whether a locking tongue is inserted in a belt buckle (16);
a trigger circuit (22) which is connected to the locking tongue sensor (20) and generates a trigger signal (TR, TR1, TR2, VT, TM) in response to the locking tongue signal;
a motor load circuit (33) which is connected to a motor load sensor (35) detecting a motor current flowing through the motor (12) and to the trigger circuit (22) and generates a motor signal (M) in response to the trigger signal (TR, TR1, TR2, VT, TM) as long as the motor current is below a blockade current level; and
a motor control circuit (34) connected to the motor load circuit (33) and the trigger circuit (22) and turning the motor (12) on in response to the motor signal (M) and off at the end of a predetermined period of time (MZ), wherein the direction of motion of the motor (12) is selected from a first direction to position the seat belt component in a fastening position and a second direction to position the seat belt component in a retaining position depending on the trigger signal (TR, TR1, TR2, VT, TM) and
wherein the motor turns for the predetermined period of time (MZ) corresponding to a distance between the fastening position and the second position, and the trigger circuit (22) has a first trigger stage (24) generating a basic trigger signal (TR) which is correlated in time with the locking tongue signal (S), the trigger circuit (22) having a second trigger stage (26) connected to the first trigger stage (24) and generating a first auxiliary trigger signal (TR1) in response to a positive edge in the basic trigger signal (TR) and a second auxiliary trigger signal (TR2) in response to a negative edge in the basic trigger signal (TR).

13. The control according to claim 12, wherein at least one delay circuit (28) is provided which is connected to the second trigger stage (26) and which generates a first and/or second delayed auxiliary trigger signal (VT) delayed in time by at least a predetermined delay period (VZ) vis-à-vis the first and/or second auxiliary trigger signal (TR1, TR2).

14. The control according to claim 12, wherein an OR gate (30) is provided which is connected to the second trigger stage (26) and the delay circuit (28), respectively, and provides a motor trigger signal (TM) at the motor load circuit (33) in response to the first or second auxiliary trigger signal (TR1, TR2) and the delayed auxiliary trigger signal (VT), respectively.

15. The control according to claim 12, wherein the direction of motion of the motor (12) is selected in response to the basic trigger signal (TR).

16. The control according to claim 12, wherein the motor control circuit (34) includes a field effect transistor (38), the gate of the field effect transistor (38) being connected to the motor load circuit (33) and a motor current being provided in response to the motor signal (M).

17. The control according to claim 12, wherein the motor control circuit (34) has a relay (36) connected to the trigger circuit (22) and determining the direction of motion of the motor (12) in response to a trigger signal (TR, TR1, TR2, VT, TM).

18. The control according to claim 12, wherein a manually operable switch (46) is provided which is connected to the trigger circuit (22), the trigger signal (TR, TR1, TR2, VT, TM) being generated depending on the switch position (A).

19. The control according to claim 12, wherein an ignition key sensor (48) is provided which generates an ignition key signal (Z) and is connected to the trigger circuit (22), the trigger signal (TR, TR1, TR2, VT, TM) being generated depending on the ignition key signal (Z).

20. The control according to claim 19, wherein the ignition key sensor (48) and the locking tongue sensor (20) are connected to the trigger circuit (22) via a logic control element (50), the logic control element (50) being configured so that in a condition of the ignition key signal (Z) the trigger circuit (22) generates the trigger signal (TR, TR1, TR2, VT, TM) independently of the locking tongue signal (S).

21. The control according to claim 12, wherein sensors are provided for detecting the position of a back seat or the folding position of a front seat, especially the front passenger seat, so as to move the seat belt positioning device (10) into the engaged position.

22. A seat belt positioning device (10) comprising a motor (12) for positioning a seat belt component (16) comprising a control (18) according to claim 1.

23. A seat belt positioning device (10) comprising a motor (12) for positioning a seat belt component (16) comprising a control (18) according to claim 12.

24. The seat belt positioning device (10) according to claim 23, wherein the seat belt positioning device is a belt buckle feeder which enables a belt buckle (16) to be positioned at a fastening position and a retaining position or only at a fastening position.

25. The control according to claim 1, wherein the distance between the fastening position and the retaining position corresponds to the motor turning for the predetermined period of time (MZ).

26. The seat belt positioning device (10) according to claim 22, wherein the seat belt positioning device is a belt buckle feeder which enables a belt buckle (16) to be positioned at a fastening position and a retaining position or only at a fastening position.

* * * * *